United States Patent
Manci et al.

(10) Patent No.: US 10,625,751 B2
(45) Date of Patent: Apr. 21, 2020

(54) DYNAMIC VEHICLE PERFORMANCE ANALYZER WITH SMOOTHING FILTER

(71) Applicant: Crown Equipment Corporation, New Bremen, OH (US)

(72) Inventors: Lewis H. Manci, New Bremen, OH (US); Philip W. Swift, Oakwood, OH (US); Lucas B. Waltz, Coldwater, OH (US)

(73) Assignee: Crown Equipment Corporation, New Bremen, OH (US)

( * ) Notice: Subject to any disclaimer, the term of this patent is extended or adjusted under 35 U.S.C. 154(b) by 19 days.

(21) Appl. No.: 15/185,646

(22) Filed: Jun. 17, 2016

(65) Prior Publication Data

US 2016/0368508 A1 Dec. 22, 2016

Related U.S. Application Data (60) Provisional application No. 62/181,153, filed on Jun. 17, 2015.

(51) Int. Cl.
*B60W 50/02* (2012.01)
*B60W 50/14* (2020.01)
(Continued)

(52) U.S. Cl.
CPC ...... *B60W 50/0205* (2013.01); *B60W 30/188* (2013.01); *B60W 50/038* (2013.01);
(Continued)

(58) Field of Classification Search
None
See application file for complete search history.

(56) References Cited

U.S. PATENT DOCUMENTS

| 6,607,142 B1 | 8/2003 | Boggs et al. |
| 2008/0154691 A1* | 6/2008 | Wellman ............ G05D 1/0282 705/7.26 |

(Continued)

FOREIGN PATENT DOCUMENTS

WO 2015035130 A2 3/2015

OTHER PUBLICATIONS

Sogno-Pabis, Elzbieta; International Search Report and Written Opinion of the International Searching Authority; International Application No. PCT/US2016/038074; dated Aug. 25, 2016; European Patent Office.

(Continued)

*Primary Examiner* — Christian Chace
*Assistant Examiner* — Kyung J Kim
(74) *Attorney, Agent, or Firm* — Stevens & Showalter, L.L.P.

(57) ABSTRACT

A computer implemented process is carried out by identifying a metric that characterizes an event associated with the operation of an industrial vehicle. Information about the metric is transmitted to an industrial vehicle. Further, the process includes receiving event data that characterizes a response of the industrial vehicle to the event. The process also includes updating a score for the instance of the metric associated with the vehicle operator by deriving a raw score value based upon the received event data, aggregating the derived raw score value to previously derived raw scores for the metric, and computing a modified score by applying a filter to the aggregate of raw score values. The process also includes comparing the computed modified score with a predetermined modification criteria, and sending a command back to the industrial vehicle to modify the industrial vehicle based upon the comparison.

18 Claims, 5 Drawing Sheets

(51) Int. Cl.
*B60W 50/038* (2012.01)
*B60W 30/188* (2012.01)
*G06Q 10/06* (2012.01)
*G07C 5/08* (2006.01)
*G07C 5/00* (2006.01)

(52) U.S. Cl.
CPC ........... *B60W 50/14* (2013.01); *G06Q 10/063* (2013.01); *G06Q 10/06393* (2013.01); *G07C 5/008* (2013.01); *G07C 5/0808* (2013.01); *B60W 2050/143* (2013.01); *B60W 2050/146* (2013.01); *B60W 2556/45* (2020.02)

(56) References Cited

U.S. PATENT DOCUMENTS

2010/0088134 A1* 4/2010 Nielsen .................. G06Q 10/06 705/7.39
2015/0064668 A1 3/2015 Manci et al.
2015/0339570 A1* 11/2015 Scheffler .................. G06N 3/04 706/16
2018/0003092 A1* 1/2018 Macfarlane .............. F01M 1/16

OTHER PUBLICATIONS

Nickitas-Etienne, Athina; International Preliminary Report on Patentability; International Application No. PCT/US2016/038074; dated Dec. 28, 2017; The International Bureau of WIPO.

Nickitas-Etienne, Athina; International Preliminary Report on Patentability and Written Opinion; International Application No. PCT/US2016/038074; dated Dec. 19, 2017; The International Bureau of WIPO.

First Office Action; Chinese Application No. 201680025262.0; dated Sep. 16, 2019; State Intellectual Property Office on the Peaople's Republic of China.

* cited by examiner

DYNAMIC VEHICLE PERFORMANCE ANALYZER WITH SMOOTHING FILTER

CROSS REFERENCE TO RELATED APPLICATIONS

This application claims the benefit of U.S. Provisional Patent Application Ser. No. 62/181,153, filed Jun. 17, 2015, entitled DYNAMIC VEHICLE PERFORMANCE ANALYZER WITH SMOOTHING FILTER, the disclosure of which is hereby incorporated herein by reference.

BACKGROUND

The present disclosure relates to electronic systems for collecting, manipulating, and assessing information related to the operation of industrial vehicles so as to produce actionable results that modify or otherwise improve the operation of fleets of industrial vehicles.

Wireless strategies are being deployed by business operations, including distributors, retail stores, manufacturers, etc., to improve the efficiency and accuracy of business operations. Wireless strategies may also be deployed by such business operations to avoid the insidious effects of constantly increasing labor and logistics costs.

In a typical wireless implementation, workers are linked to a management system executing on a corresponding computer enterprise via mobile wireless transceivers. The wireless transceivers are used as interfaces to the management system to direct workers in their tasks, e.g., by instructing workers where and/or how to pick, pack, put away, move, stage, process or otherwise manipulate the items within a facility. The wireless transceiver may also be used in conjunction with a suitable input device to scan, sense or otherwise read tags, labels or other identifiers to track the movement of designated items within the facility.

BRIEF SUMMARY

According to aspects of the present disclosure a computer implemented process of controlling industrial vehicle performance comprises identifying, at a server computer, a metric, such as a vehicle performance metric. The metric is characterized by an event associated with the operation of an industrial vehicle. Moreover, the metric has at least one performance parameter to evaluate against the event. In an example implementation, the performance parameter is defined in such a way as to include at least two states, a proper outcome, e.g., a proper vehicle performance in response to the event, and an improper outcome, e.g., an improper vehicle performance in response to the event. Moreover, the metric is associated with an industrial vehicle operator login identification. This allows data associated with the metric to be sorted and evaluated on a per vehicle operator basis. The process also comprises transmitting information about the metric to the industrial vehicle to which an operator has logged in with the industrial vehicle operator login identification. The information about the metric thus triggers specific programming within the industrial vehicle to begin processing the received information against monitored industrial vehicle operational information.

Still further, the process comprises performing in an ongoing manner, operations that include receiving, at the server computer, event data that characterizes a response of the industrial vehicle to an occurrence of the event (corresponding to the metric), and updating a score for the metric that is associated with the vehicle operator. The process updates the score for the instance of the metric associated with the vehicle operator by deriving a raw score value based upon the received event data, aggregating the derived raw score value to previously derived raw scores for the metric associated with the vehicle operator, and, computing a modified score by applying a filter to the aggregate of raw score values. As an example, a raw score value can be derived by evaluating the event data, e.g., by comparing the event data to the expected proper outcome, improper outcome, or combination thereof, etc.

The process yet further comprises comparing the computed modified score with predetermined modification criteria (e.g., duration and benchmark), and sending a command back to the industrial vehicle to modify the industrial vehicle based upon the comparison of the computed modified score with the predetermined modification criteria.

According to further aspects of the present disclosure, a system is provided for dynamic industrial vehicle monitoring and modification. The system comprises an interface that receives logon information of a vehicle operator. In this configuration, the vehicle operator must successfully log into an industrial vehicle before the industrial vehicle is fully operational. The system also comprises a wireless transceiver on the industrial vehicle. The wireless transceiver receives information about a metric that characterizes an event associated with the operation of an industrial vehicle. In this regard, the metric has at least one performance parameter to evaluate against the event. The system also comprises a processor on the industrial vehicle. The processor is programmed to detect an encounter of the industrial vehicle corresponding to the event associated with the metric, and collect operation information on a current operating state of the industrial vehicle during the event by communicating with native electrical components of the industrial vehicle across a vehicle network bus so as to monitor a response of the industrial vehicle as a result of the encounter with the event.

The processor is further programmed to generate event data from the collected operational information that characterizes a response of the industrial vehicle to the event corresponding to the metric, and communicate the generated event data to a remote server computer via the wireless transceiver. Still further, the processor is programmed to receive from the remote server computer, a command to modify the performance of the industrial vehicle, where the modification is based upon a score computed based upon previous encounters with the event, where the score is processed by a smoothing filter applied to a history of data collected in response to the metric.

DETAILED DESCRIPTION

The disclosure herein improves the technologies of industrial vehicles, machine-to-machine communication, and wireless, real-time control and configuration of industrial vehicles. For instance, various aspects of the present disclosure address the technical problem of industrial vehicle control and operation by providing a technical solution that collects and blends industrial vehicle operational information with dynamic events such as those events linked to geo-features. As a result, measures of industrial vehicle usage and performance are generated and aggregated in an ongoing manner, e.g., whenever the industrial vehicle encounters an event. The aggregated measures are assessed as scores, which are then used to impact the performance capabilities or otherwise affect the operation of the fleet of industrial vehicles.

The technical solutions herein bring about several technical effects, including real-time, continuously variable control (e.g., event-driven control) of industrial vehicles in a manner that effectively manages outliers generated by the industrial vehicle in response to certain events. Moreover, improved technical effects include real-time and continuous monitoring of industrial vehicle performance, allowing for adjustments, including optimizations in industrial vehicle capability and performance under dynamic and changing environmental circumstances.

As will be described more fully herein, in certain aspects of the present disclosure, the scoring capability is tied to ongoing monitoring so that scores are dynamically updated as industrial vehicles are operated. In this regard, dynamic environmental conditions may cause an industrial vehicle operator to deviate from typical or otherwise expected operation in response to a particular situation. Such special circumstances, whether the fault of the vehicle operator or not, will adversely affect raw scores. However, this adverse effect on the score is not necessarily a true reflection of the overall skill and training of the operator in the use of the industrial vehicle.

Accordingly, aspects of the present disclosure address outliers by computing scoring with the use of filtering/smoothing capability, e.g., via rolling average filtering, as described more fully herein, to provide the ability to accurately track vehicle and operator performance in a way that is meaningful in the context of fleet management.

The smoothed scores are linked with feedback to the vehicle operator and to control the capabilities of industrial vehicles, e.g., to set limits on performance, to remove restrictions on performance, to add metrics for evaluation and scoring, to remove metrics from evaluation and scoring, etc.

In this regard, aspects of the present disclosure attribute or otherwise correlate industrial vehicle usage and performance data to a corresponding vehicle operator, which can then be used as a measure to evaluate behavior, performance, proficiency, etc. The ability to attribute or otherwise correlate usage and performance data to a vehicle operator facilitates operator inculcation (including persuasive and/or behavioral) by providing timely information to the vehicle operator through automated and time-sensitive control of industrial vehicles (e.g., by providing messaging, instruction, affirmation, negative reinforcement, etc.). As used herein, the term "inculcate" and variants thereof, means to instill or otherwise impress information upon the vehicle operator by instruction or repetition.

The ability to attribute or otherwise correlate usage and performance data to a vehicle operator facilitates the ability to enable the operator to establish rankings that will ultimately enable the vehicle operator to utilize advanced performance capabilities of certain industrial vehicles.

In this regard, the capabilities and features set out in U.S. patent application Ser. No. 14/478,015, titled "DYNAMIC OPERATOR BEHAVIOR ANALYZER", filed Sep. 5, 2014, is herein incorporated by reference in its entirety.

Also, the capabilities and features set out in U.S. Provisional Patent Application Ser. No. 62/166,082, titled "INDUSTRIAL VEHICLE GEO-FEATURE SYSTEM", filed May 25, 2015, is herein incorporated by reference in its entirety.

Still further, the capabilities and features set out in U.S. Pat. No. 8,060,400, titled "FLEET MANAGEMENT SYSTEM", issued Nov. 15, 2011, is herein incorporated by reference in its entirety.

System Overview

Figure 1:
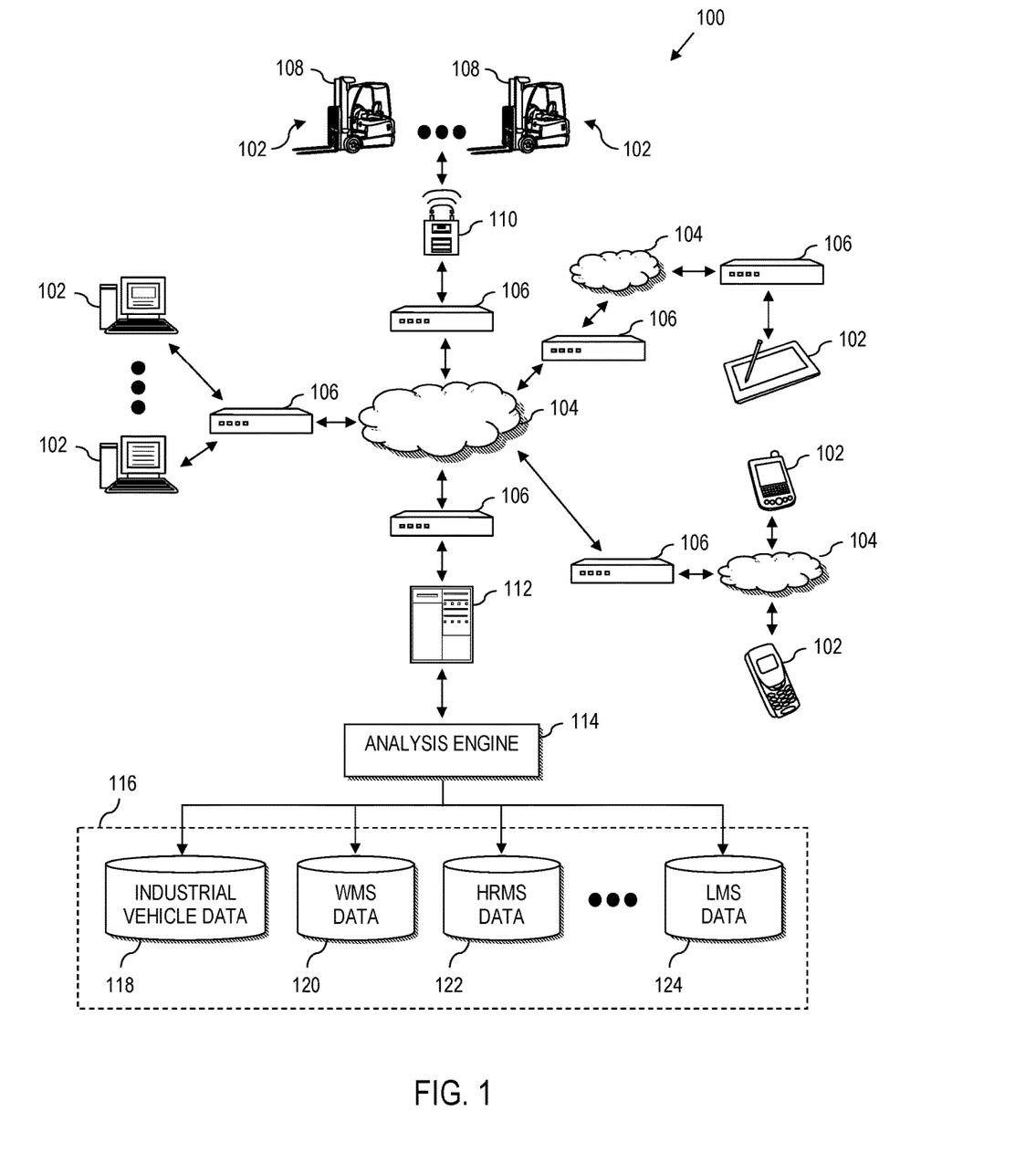
FIG. 1 is a block diagram of a system that implements a dynamic vehicle performance analyzer, according to aspects of the disclosure.

Referring now to the drawings and in particular to FIG. 1, a general diagram of a computer system 100 is illustrated according to various aspects of the present disclosure. The illustrated computer system 100 is a special purpose (particular) system that operates using geo-features, event descriptions, or combinations thereof, as set out in greater detail herein. The computer system 100 comprises a plurality of hardware processing devices (designated generally by the reference 102) that are linked together by one or more network(s) (designated generally by the reference 104).

The network(s) 104 provides communications links between the various processing devices 102 and may be supported by networking components 106 that interconnect the processing devices 102, including for example, routers, hubs, firewalls, network interfaces, wired or wireless communications links and corresponding interconnections, cellular stations and corresponding cellular conversion technologies (e.g., to convert between cellular and TCP/IP, etc.). Moreover, the network(s) 104 may comprise connections using one or more intranets, extranets, local area networks (LAN), wide area networks (WAN), wireless networks (WiFi), the Internet, including the world wide web, cellular and/or other arrangements for enabling communication between the processing devices 102, in either real time or otherwise (e.g., via time shifting, batch processing, etc.).

A processing device 102 can be any device capable of communicating over the network 104. Examples of processing devices 102 include a transactional system, purpose-driven appliance, personal data assistant (PDA), palm computers, cellular devices including cellular mobile telephones and smart telephones, tablet computers, netbook computers, notebook computers, personal computers and servers. Additional examples of a processing device 102 include an electronic control unit (ECU), a display of the industrial vehicle, etc.

In certain contexts and roles, a processing device 102 is intended to be mobile (e.g., a processing device 102 provided on an industrial vehicle 108 such as a forklift truck, reach truck, stock picker, turret truck, tow tractor, rider pallet truck, walkie stacker truck, etc.). In this regard, industrial vehicles include a processing device 102 that communicates wirelessly to the network 104 to carry out the features described herein. Under such circumstances, the industrial vehicles 108 can wirelessly communicate through one or more access points 110 to a corresponding networking component 106. Alternatively, the industrial vehicles 108 can be equipped with WiFi, cellular or other suitable technology that allows the processing device 102 on the industrial vehicle 108 to communicate directly with a remote device (e.g., over the networks 104).

The illustrative computer system 100 also includes a processing device implemented as a server 112 (e.g., a web server, file server, and/or other processing device) that supports an analysis engine 114 and corresponding data sources (collectively identified as data sources 116). The analysis engine 114 and data sources 116 provide the resources to implement and store data related to geo-features and encounters with geo-features, captured events, combinations thereof, etc., as described in greater detail herein.

In an exemplary implementation, the data sources 116 are implemented by a collection of databases that store various types of information related to a business operation (e.g., a warehouse, distribution center, retail store, manufacturer, etc.). However, these data sources 116 need not be co-located. In the illustrative example, the data sources 116 include databases that tie processes executing for the benefit of the enterprise, from multiple, different domains. In the illustrated example, data sources 116 include an industrial vehicle information database 118 (supporting processes executing in an industrial vehicle operation domain), a warehouse management system (WMS) 120 (supporting processes executing in WMS domain that relate to movement and tracking of goods within the operating environment), a human resources management system (HRMS) 122 (supporting processes executing in an HRMS domain), a labor management system (LMS) 124 (supporting processes executing in an LMS domain), etc. The above list is not exhaustive and is intended to be illustrative only. Moreover, data can come from sources that are not directly and/or locally connected to the analysis engine 114. For instance, in certain exemplary implementations, data may be obtained from remote servers (e.g., to access manufacturer databases, etc.).

Industrial Vehicle

Figure 2:
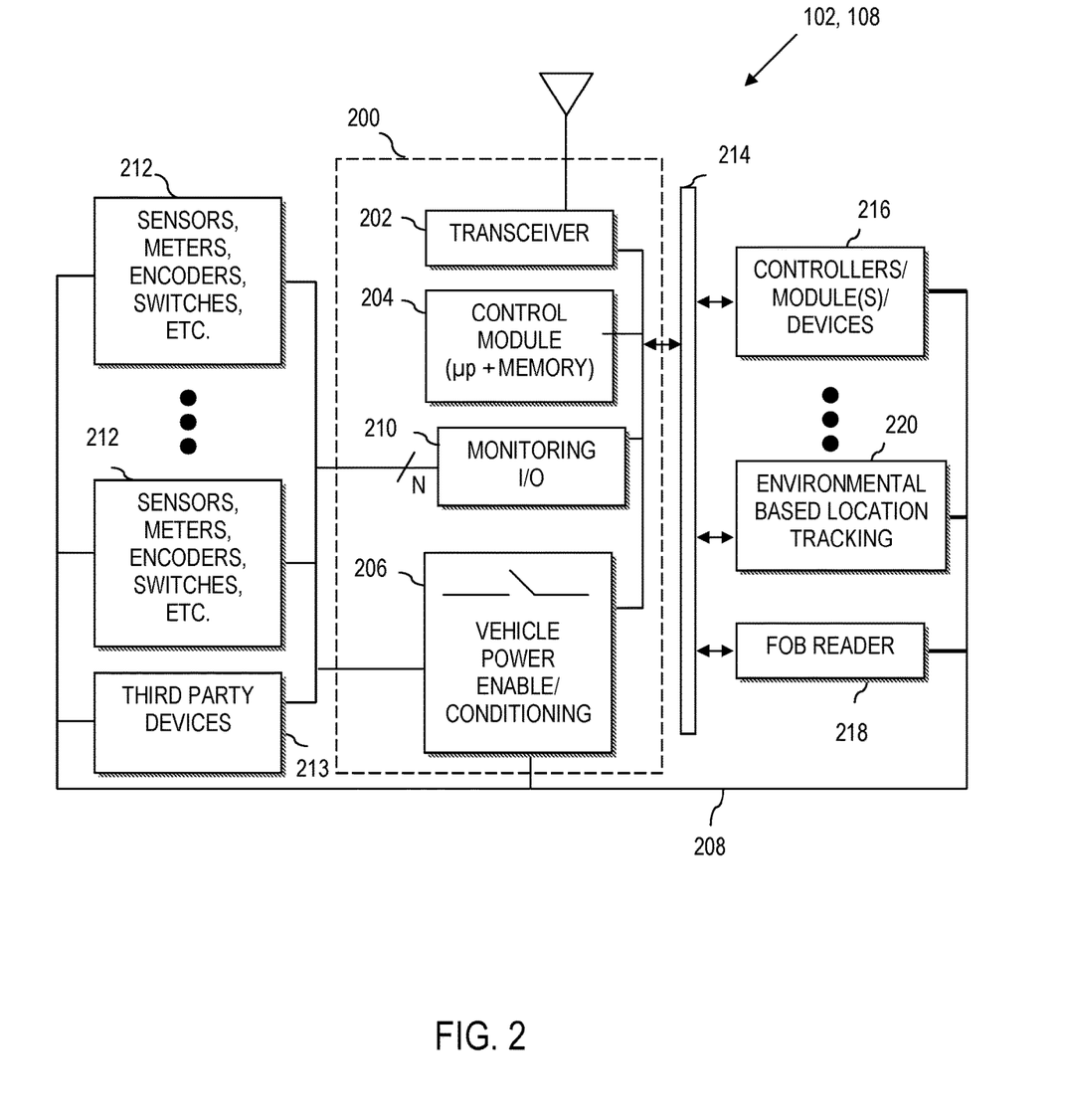
FIG. 2 is a block diagram of a special purpose processing device on an industrial vehicle, according to aspects of the present disclosure herein.

Referring to FIG. 2, a processing device 102 is provided on an industrial vehicle 108. Here, the processing device 102 is a special purpose, particular computer, such as a device that mounts to or is otherwise integrated with the industrial vehicle 108. As such, the processing device 102 can interact with the structures and devices described with reference to FIG. 1. The processing device 102 includes a processor coupled to memory to carry out instructions. However, the execution environment of the processing device 102 is further tied into the industrial vehicle 108 making it a particular machine different from a general purpose computer.

The illustrated processing device 102 is implemented as an information linking device 200 that comprises the necessary circuitry to implement wireless communication, data and information processing, and wired (and optionally wireless) communication to components of the industrial vehicle 108. As a few illustrative examples, the information linking device 200 includes a transceiver 202 for wireless communication. Although a single transceiver 202 is illustrated for convenience, in practice, one or more wireless communication technologies may be provided. For instance, the transceiver 202 may be able to communicate with a remote server, e.g., server 112 of FIG. 1, via 802.11.xx across the access points 110 of FIG. 1. The transceiver 202 may also optionally support other wireless communication, such as cellular, Bluetooth, infrared (IR) or any other technology or combination of technologies. For instance, using a cellular to IP bridge, the transceiver 202 may be able to use a cellular signal to communicate directly with a remote server, e.g., a manufacturer server.

The information linking device 200 also comprises a control module 204, having a processor coupled to memory for implementing computer-implemented processes, or aspects thereof, as set out and described more fully herein. The control module 204 communicates with the components set forth in FIG. 2 described more fully herein making the information linking device 200 a particular machine different from a general purpose computer. For instance, the control module 204 utilizes the transceiver 202 to exchange information with a remote server 112 (FIG. 1) for controlling operation of the industrial vehicle 108, for remotely storing information extracted from the industrial vehicle 108, etc.

Additionally, the control module 204 implements processes such as operator log on, pre-use inspection checklists, data monitoring and other features, examples of which are described more fully in U.S. Pat. No. 8,060,400 to Wellman, already incorporated by reference herein.

The information linking device 200 further includes vehicle power enabling circuitry 206 to selectively enable or disable the industrial vehicle 108 and/or selectively enable or disable select components of the industrial vehicle 108. More particularly, the power enabling circuitry 206 is controlled by the control module 204 to selectively enable or disable the industrial vehicle 108 (or alternatively, to selectively enable or disable specific control modules or vehicle functions such as hydraulic, traction, etc.). For instance, the control module 204 can control the industrial vehicle power enabling circuitry 206 to provide power to: the industrial vehicle 108, select components of the industrial vehicle 108, select vehicle functions, etc. via power line 208, e.g., based upon operator login, detected geo-features, etc.

Thus, in certain implementations, the vehicle power enabling circuitry 206 can partially enable the industrial vehicle for operation, or fully enable the industrial vehicle for operation, e.g., depending upon proper operator login, e.g., by controlling the power connection 208. Also, the industrial vehicle power enabling circuitry 206 may be utilized by geo-features to control access to an industrial vehicle 108, e.g., to perform vehicle lock-out for violating a warehouse procedure, such as sitting idle too long in a designated area.

Still further, the information linking device 200 includes a monitoring input/output (I/O) module 210 to communicate via wired or wireless connection to peripheral devices mounted to or otherwise on the industrial vehicle, such as sensors, meters, encoders, switches, etc. (collectively represented by reference numeral 212). The information linking device 200 may also be connected to other devices, e.g., third party devices 213 such as RFID scanners, displays, meters or other devices. This allows the control module 204 to obtain and process information monitored on the industrial vehicle 108 via the monitoring I/O module 210.

The information linking device 200 is coupled to and/or communicates with other industrial vehicle system components via a suitable industrial vehicle network system 214, e.g., a vehicle network bus. The industrial vehicle network system 214 is any wired or wireless network, bus or other communications capability that allows electronic components of the industrial vehicle 108 to communicate with each other. As an example, the industrial vehicle network system may comprise a controller area network (CAN) bus, ZigBee, Bluetooth, Local Interconnect Network (LIN), time-triggered data-bus protocol (TTP) or other suitable communication strategy.

As will be described more fully herein, utilization of the industrial vehicle network system 214 enables seamless integration of the components of the information linking device 200 into the native electronics of the industrial vehicle 108. In the example configuration, the control module 204 of the information linking device 200 connects with, understands and is capable of communication with native vehicle electronic components, such as traction controllers, hydraulic controllers, modules, devices, bus enabled sensors, displays, lights, light bars, sound generating devices, headsets, microphones, haptic devices, etc. (collectively referred to by reference 216). Devices 216 can also include graphics displays (e.g., that support a graphical user interface), keypads, input/output devices, etc., that interact or control elements in the graphical user interface of the display.

The information linking device 200 can also communicate with a fob 218 (or keypad, card reader or any other device) for receiving operator log in identification.

According to yet further aspects of the present disclosure, an environmental based location tracking device 220 may be provided on the industrial vehicle 108. As illustrated, the environmental-based location tracking device 220 is connected to the vehicle electronics via the industrial vehicle network system 214 (e.g., CAN bus). As a result, the environmental-based location tracking device 220 can communicate directly with the control module 204, as well as other devices linked to the industrial vehicle network system 214 of the corresponding industrial vehicle 108. The environmental-based location tracking device 220 enables the industrial vehicle 108 to be spatially aware of its location within a dimensionally constrained environment, e.g., a mapped portion of a warehouse.

In the applications described more fully herein, a conventional technology such as a global positioning system (GPS) is not likely to be effective when the industrial vehicle 108 is operated indoors. However, the environmental-based location tracking device 220 can comprise a local awareness system that utilizes markers, including fiducial markers, RFID, beacons, lights, or other external devices to allow spatial awareness within the warehouse environment. Moreover, local awareness can be implemented by machine vision guidance systems, e.g., using one or more cameras. The environmental-based location tracking device 220 may also/alternatively use transponders and triangulation calculations to determine position. Yet further, the environmental-based location tracking device 220 can use combinations of the above and/or other technologies to determine the current (real-time) position of the industrial vehicle 108. As such, the position of the industrial vehicle 108 can be continuously ascertained (e.g., every second or less) in certain implementations. Alternatively, other sampling intervals can be derived to continuously (e.g., at discrete defined time intervals, periodic or otherwise constant and recurring time intervals, intervals based upon interrupts, triggers or other measures) determine industrial vehicle position over time.

The environmental-based location tracking device 220 can also use knowledge read from inertial sensors, vehicle sensors, encoders, accelerometers, gyroscopes, etc., (e.g., via the controllers 216 across the industrial vehicle network system 214, via sensors 212 and/or third party devices 213 across the monitoring I/O 210 and industrial vehicle network system 214, etc.) to determine the position of the industrial vehicle 108 within the warehouse and/or to augment or modify the position determination from the location tracking device 220.

The environmental-based location tracking device 220 is aware of the absolute position of the industrial vehicle 108 within a dimensionally limited environment, e.g., a mapped portion of a warehouse. By "absolute" position, it is meant that the vehicle position is known relative to a map. The map may be a regional area, e.g., only a portion of an indoor facility such as a warehouse. In certain illustrative implementations, the absolute position of the industrial vehicle 108 may be known, but orientation may be unknown. In other implementations, orientation and absolute position are known.

Geo-Feature Creation

According to various aspects of the present disclosure, geo-features (which can be created in a virtual environment, e.g., server, tablet, personal computer, etc.), are deployed in a corresponding physical environment (e.g., warehouse) where industrial vehicles 108 operate. Geo-features are used to correlate events to location information. In this regard, geo-features can be defined as fixed, specific locations within the warehouse. For instance, fixed geo-features can be established at the end of warehouse aisles, to identify height restrictions at doorways and low overhead areas, speed zone lanes, etc.

Also, geo-features need not be spatially fixed. For instance, geo-features can be associated with vehicles or other moving assets. Thus, a moving geo-feature may be associated with an industrial vehicle, e.g., to tag specific vehicle actions with position-based information. Moreover, geo-features may also be productivity based. For instance, geo-features can be linked to tasks such as WMS tasks (e.g., picks, putaways, etc.), extrinsic data such as time, date, shift, operating conditions, etc., within the computing enterprise in which the industrial vehicles operate.

Monitoring and Modification of Vehicle Operation

According to aspects of the present disclosure, a system and process implements dynamic monitoring and modification of vehicle operation. In certain implementations, the dynamic monitoring and modification can affect operator behavior, e.g., based upon scoring and/or automated industrial vehicle control implemented by the processor in response to scoring. In general, an industrial vehicle 108 includes a processing device 102 that is configured as a special processor (e.g., as described with reference to FIG. 1 and FIG. 2) that is programmed to carry out computer-implemented processes or parts thereof, either as a stand-alone, or in part of a system that also includes interaction with a server computer (e.g., the server 112), analysis engine 114 and one or more of the data sources 116 (FIG. 1)

By way of illustration, and not by way of limitation, scoring is used to gauge industrial vehicle performance in the compliance with environmental policies, e.g., stop at the end of an aisle, sound a horn at the end of an aisle, obey speed restricted zones, avoid height restricted zones, avoid geo-fenced zones, minimize time in idle zones, etc. Moreover, scoring can be used to measure impacts, operator efficiencies, energy conservation, etc. Yet further, scoring can be tied to productivity, e.g., as measured by the number of picks or putaways performed by an operator per shift, per hour, etc.

Figure 3:
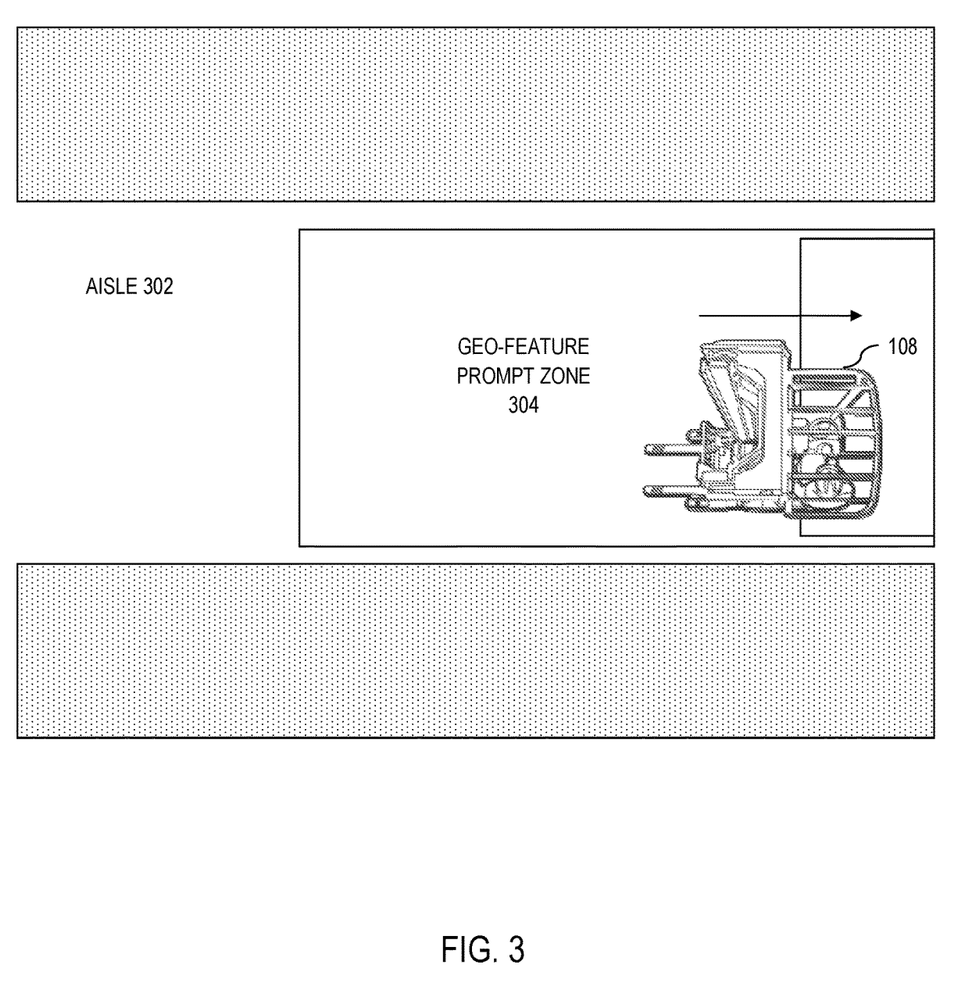
FIG. 3 illustrates an industrial vehicle improperly traveling through an intersection containing a geo-feature implemented as a stop zone, where the industrial vehicle travels through the geo-feature without stopping.

By way of simplified example to illustrate the concepts herein, reference is drawn to FIG. 3.

Set-Up

Prior to the setting of FIG. 3, a server computer (e.g., server 112 of FIG. 1) identifies a metric that characterizes an event associated with the operation of an industrial vehicle. Here, the metric has at least one performance parameter to evaluate against the event.

Moreover, as noted with reference to FIG. 2, the information linking device 202 includes an interface (e.g., fob reader 218) that receives logon information of a vehicle operator, where the vehicle operator must successfully log into an industrial vehicle before the industrial vehicle is fully operational. As such, the industrial vehicle, via the transceiver 202, can wirelessly identify to the server computer 112 (FIG. 1), the identity of the industrial vehicle itself, and the operator of the industrial vehicle. Notably, the server 112 associates the metric with an industrial vehicle operator login identification. In this way, the system can link industrial vehicle actions to events and vehicle operators involved during the occurrence of such events as described below.

The server computer 112 transmits information about the metric to the industrial vehicle 108 to which an operator has logged in with the industrial vehicle operator login identification. In this manner, the transceiver 202 of the information linking device 200 on the industrial vehicle wirelessly receives the information about the metric that characterizes an event associated with the operation of an industrial vehicle, which was communicated by the server computer 112.

Correspondingly, the control module 204 on the industrial vehicle 108 receives the information about the metric from the server. This triggers specific programming within the industrial vehicle 108 (e.g., within the control module 204 of the information linking device 200) to begin processing the received information against monitored industrial vehicle operational information.

Operation

The processor of the control module 204 on the industrial vehicle 108 detects an encounter corresponding to the event associated with the metric, e.g., by monitoring controller states of controllers 216 via the industrial vehicle network system 214, via data received from the monitoring I/O 210, from data received from the environmental based location tracking system 220, from messages received from the server computer 112 or other source, etc. Upon recognizing an event, the control module 204 collects operation information on a current operating state of the industrial vehicle 108 during the event by communicating with electrical components of the industrial vehicle across the industrial vehicle network system 214 (e.g., industrial vehicle bus such as a CAN bus) so as to monitor a response of the industrial vehicle 108 as a result of the encounter with the event. The control module 204 then generates event data from the collected operational information. The generated event data characterizes a response of the industrial vehicle to the event corresponding to the metric. The control module 204 then communicates the generated event data to the server computer 112 via the wireless transceiver 202.

Correspondingly, the server 112 performs in an ongoing manner, operations comprising receiving event data from an industrial vehicle that characterizes a response of the industrial vehicle to the event corresponding to the metric. The server computer 112 also performs processes including updating a score for the instance of the metric associated with the vehicle operator by deriving a raw score value based upon the received event data, aggregating the derived raw score value to previously derived raw scores for the metric associated with the vehicle operator, and, computing a modified score by applying a filter to the aggregate of raw score values, comparing the computed modified score with a predetermined modification criteria. These computations at the server computer 112 are discussed in greater detail herein.

The server computer 112 also sends a command back to the industrial vehicle 108 to modify the industrial vehicle 108 based upon the comparison of the computed modified score with the predetermined modification criteria. The corresponding industrial vehicle 108 receives the command to modify the performance of the industrial vehicle from the server computer 112, via the transceiver 202. The modification is based upon the score computed based upon previous encounters of the event, as described more fully herein. The command is communicated to the control module 204. In response thereto, the control module 204 issues the appropriate commands to the industrial vehicle to carry out the command. For instance, the control module 204 can communicate with electrical components of the industrial vehicle across the industrial vehicle network system 214 to change operational set points, adjust operational parameters, trigger actions, prompt the display of messages, etc.

Turning more precisely to FIG. 3, in the schematic illustration of an example implementation, as the operator advances towards the end of an aisle, the operator is supposed to stop and sound the horn. Thus, an example event identified by the server 112 is an "end-of-aisle" event. Here, an example of a metric is a measure of how the industrial vehicle 108 reacts in response to the end-of-aisle event. In this example, there are at least two performance parameters, e.g., did the industrial vehicle 108 stop properly at the end of the aisle, and did the industrial vehicle 108 properly engage the horn before proceeding through the designated stop zone.

To verify the proper industrial vehicle operation, a geo-feature is set up at the end of the aisle. As such, the environmental based location tracking (e.g., 220 FIG. 2) is used to detect that the industrial vehicle 108 is approaching the end of an aisle. Moreover, geo-feature information loaded into the industrial vehicle 108 informs the vehicle processor of the control module 204 as to what constitutes a proper action in stopping and sounding the horn. The processor can then use a graphical user interface on the vehicle to optionally communicate information to the vehicle operator, e.g., instructions about the existence of the geo-feature, expected behavior, etc.

Upon detecting the presence of the geo-zone and corresponding event identified by the server computer 112, the industrial vehicle processor begins to log vehicle data, e.g., by monitoring the vehicle state over time. The vehicle processor also logs whether the operator stopped and sounded the horn, such as by recording information related to vehicle speed, checking the horn state, etc., while the industrial vehicle is detected in the geo-zone. The processor, e.g., the control module 204 can also optionally provide feedback to the vehicle operator, e.g., positive affirmations or negative information displayed on a display on the industrial vehicle. The system can also use lights, sound, haptic feedback or other means to communicate with the operator.

The results of the encounter with the end of aisle event are sent to the server (e.g., server 112 of FIG. 1) where the collected data is associated with one or more metrics to identify the time of the interaction with the event, to identify data corresponding to the performance parameters, which is indicative of whether the operator stopped and sounded the horn, etc. At the server, the data associated with the metric is aggregated with previously collected data, and one or more scores are computed, as set out in greater detail herein. Assume for example that the operator did in fact, properly stop and sound the horn. The command to the industrial vehicle can be to suppress warning messages, provide a positive affirmation of proper action, unlock vehicle features such as top speed, etc. As additional examples, assume that the operator failed in one or both measured parameters (i.e., stop and sound the horn). The command sent by the server may be to limit the top speed of the vehicle, to send a warning message, etc. In this regard, in certain embodiments, not every encounter with an event necessarily triggers an action, or triggers an action detectable by the operator.

In view of the above, vehicle intelligence is imparted in several distinct regards. The processing device 102 is aware of the identity of the particular vehicle operator. For instance, a vehicle operator may be required to provide logon information to operate the vehicle (e.g., via fob reader 218 FIG. 2). Also, the processing device 102 is aware of one or more events that can trigger an operator behavior response. An event may be based, at least in part, upon "local awareness," (i.e., events or conditions going on within/on/to the vehicle itself) "environmental awareness," (i.e., events or conditions external to the vehicle) "operator awareness," (i.e., actions of the operator) or combinations thereof. Whether based upon local awareness, environmental awareness, operator awareness, or combinations thereof, where the event is further tied to position information, the event can be characterized with a geo-feature. Various techniques for collecting event data is set out in greater detail in U.S. patent application Ser. No. 14/478,015, already incorporated by reference herein, as well as in U.S. Provisional Patent Application Ser. No. 62/166,082, also already incorporated by reference herein.

Example Scoring Set-Up

In an illustrative example, and in any combination with the preceding FIGURES, a set of metrics are defined. Each metric corresponds to an event associated with the operation of the industrial vehicle. As such, the selection of metrics may be tailored to impart improvements in warehouse operations (e.g., through limiting impacts, maintaining industrial vehicle stability, adherence to speed limits and stop signs, regular communication and following 'right of way' practices, proper load weights and lift heights, etc.) and through the communication of these behaviors throughout the warehouse.

Metrics can include features that can be discerned by queries across a vehicle network bus, e.g., to determine acceleration such as sudden, abrupt starts; activations such as a correct frequency of button activations (e.g., "Assist" features during a task); or battery characteristics, such as whether the battery is underweight, the battery change duration, or whether battery queue instructions are followed.

Metrics can be derived from location based tracking capabilities provided on the industrial vehicle, server, operating environment, or combinations thereof. Examples of such metrics may include the frequency of following system instructions when using semi-automation features; direction of travel, use of a horn, lights, etc., in specific areas, and energy usage vs. cases/pallets moved vs. driving habits. Yet other metrics may include vehicle speed when passing another truck closely in a narrow aisle; whether an industrial vehicle enters a restricted area, obeys speed zones, performs necessary stops, yields, etc.

Metrics can also be performance based, e.g., where the industrial vehicle tracks efficiency, such as whether there is excessive travel or lift outside of an ideal path; whether the operator performs incorrect picks or putaways, etc.

Each metric may have a parameter that is used to store a mode (inculcating, normal, warning, etc.) for that event. Each metric may also have at least one performance parameter to evaluate against the associated event. A performance parameter defines the desired, intended, appropriate or otherwise required vehicle response (which may require a specific operator behavior) to an occurrence of the event associated with the metric. The performance parameter is defined in such a way as to include at least two states, a proper outcome, e.g., a proper vehicle performance in response to the event (thus a correct behavior), and an improper outcome, e.g., an improper vehicle performance in response to the event (thus an incorrect behavior).

For instance, keeping with the above-example, if a metric is to stop and sound a horn at the end of an aisle, the event needs to be converted into data that can be understood by an automated process to determine whether the industrial vehicle stopped and/or sounded the horn. Thus, an "end of aisle metric" may be configured to use location tracking to identify proximity of the industrial vehicle to an end of an aisle. Also, the process may be programmed to read information off of the industrial vehicle CAN bus (or other local vehicle network) so that the system can ascertain whether the operator did, in fact, stop and engage the horn at the proper time. Thus, configuring the metrics comprises setting all necessary parameters, values, rules, etc., which are associated with metrics as described more fully herein.

Still further, each metric may have at least one response action that educates the vehicle operator as to the necessary behavior to reach a desired outcome in response to an event (e.g., to satisfy or otherwise comply with the corresponding performance parameter(s)). For instance, a message may be communicated to the vehicle operator before and/or after the encounter with the end of aisle to bring awareness to the vehicle operator of the desired vehicle response (e.g., stop and sound horn in the present example).

In addition to the above, metrics can include an order/weight. For instance, it is likely that certain events will carry a higher importance to the operation of a fleet for certain customers, but not for all customers. As such, metrics can be customized and scaled to reflect the sensibilities and requirements of the business, local, state or federal laws, etc. Moreover, the metrics can be aggregated up various hierarchical levels (e.g., up to a single, top level score). This score can be used to evaluate vehicles and vehicle operators. Still further, the metric can be associated with a benchmark. As used herein, the term "benchmark" means some measure that allows a comparison of the values associated with the metric to some standard. The benchmark can be adjusted (e.g., to account for different shifts, locations, or other criteria).

In certain implementations, each metric has various categories of data values associated therewith. An exemplary set of categories include an event description, behavior modification action, mode rules, pre-action trigger(s), evaluation rule(s), a benchmark, and a weight, as set out in greater detail in U.S. patent application Ser. No. 14/478,015, already incorporated by reference herein.

Moreover, the metrics can be tied to specific vehicle operators. In this regard, each operator in a fleet need not be associated with all metrics. Rather, each operator can be assigned to one or more metrics. Moreover, the metrics associated with an operator can change over time, e.g., by adding metrics to judge an operator. In this regard, the more an operator can show proficiency at a metric, and increase the number metrics that the operator is proficient at, the higher the overall operator score.

The processing device 102 records a measure of the vehicle operator's performance in responding to the event (e.g., when the event actually occurs). The recorded data can be sent to the server for storage and subsequent analysis. Alternatively, the recorded data can be stored and/or analyzed on the industrial vehicle 108. Over time and over one or more repeated encounters with the event, a history of industrial vehicle performance is generated across one or more metrics (associated with the vehicle operator). The historical data is integrated into a scoring engine that scores the vehicle performance.

Scoring

According to aspects of the present disclosure, industrial vehicle operation is scored. Scores can be based upon a number of different metrics. Thus, there may be a hierarchy of scores, including an overall score.

As a few non-limiting but illustrative examples, a score value associated with a response to an event can be a Boolean value tied to a specific operator behavior (e.g., the vehicle operator scores 1 point for each successful stop at an intersection), the vehicle operator score may be adversely affected by failure to demonstrate the expected behavior (e.g., the vehicle operator score is reduced by 1 point for each failure to stop at an intersection), combinations thereof, etc.

In other exemplary implementations, a behavior has a range of points. For instance, for a putaway, the operator may score X out of a possible Y points based upon predetermined parameters. Numerous other examples can use a range of possible points, thus this is merely by way of example.

In yet further exemplary implementations, scores can be modified based upon achievements. For instance, the system can evaluate data across a time history and/or across multiple data sources (e.g., the industrial vehicle data 118, the WMS data 120, the HRMS data 122, the LMS data 124, etc.), and score points for X days without an impact, score points for improving efficiency of operation, etc.

According to further illustrative aspects of the present disclosure, a metric such as impact avoidance has a score characteristic where the best that a vehicle operator can accomplish is 100% impact free, corresponding to zero impacts. Correspondingly, certain metrics, such as those related to performance, have an artificial number that calibrates to 100%. In this manner, a vehicle operator may, in certain conditions, be able to exceed the maximum, i.e., exceed 100%. For example, a metric that measures putaways, can require X total putaways per shift to correspond to a 100% score. A vehicle operator that completes X+n putaways could achieve a score above 100%. Correspondingly, a vehicle operator that completes X-m total putaways will achieve a score less than 100%.

Further examples of scoring, setting up metrics, and evaluating vehicle performance against metrics is set out in U.S. patent application Ser. No. 14/478,015, already incorporated by reference herein.

Enhanced Score Calculations and Score Impact on Vehicle Operation

According to certain aspects of the present disclosure, a duration of desired or expected performance, e.g., which can correlate to a duration of correct operator behavior/proper vehicle operation, enables one or more new characteristics of performance on the industrial vehicle to be enabled. In this regard, outliers, e.g., as caused by incidental actions of the industrial vehicle can be tuned to not adversely affect the successive streak required before the industrial vehicle is enabled with a new feature, set of features, capability, or other modification.

To illustrate with a simple example, assume that the desired performance is a vehicle stop at the end of an aisle. Also, assume that a predetermined duration of proper behavior is established. The duration can be based on number of iterations, independent of time, e.g., 20 successful stops. The duration can be based upon time, e.g., successful stops over the period of one month. Yet further, the duration can be based upon a combination of time and iteration, e.g., at least 20 successful stops in one consecutive month.

In an absolute system, if the operator performs 17 successful stops, but fails to stop at the 18th encounter with a stop event, then the new feature will not be unlocked and the duration is reset, despite normally proper operation. However, according to aspects of the present disclosure, a smoothing filter is applied to the metrics used to compute scores. The smoothing filter can be tuned to filter out outliers so that, if the vehicle operator resumes normal proper behavior, the one outlier will not have a significant negative impact on the computed score for a given metric.

By way of example, a smoothing filter such as a rolling average filter is applied to the score. In other example implementations, the filter may be in the form of a convolution filter, low pass filter, moving median filter, Butterworth filter, Kalman filter, Exponential smoothing etc.

Moreover, the smoothing filter may be a simple implementation, e.g., rolling average of X consecutive measurements (such as 3-5 measurements). In alternative implementations, the smoothing filter can be cumulative, weighted, etc. For instance, proper vehicle responses (which correlates to proper operator behavior), such as stopping at the end of the aisle, may have a different weight than improper vehicle responses, e.g., failing to stop. Moreover, external variables may impact the weighting. For instance, extrinsic information such as proximity of other industrial vehicles, time of day, shift, operator identification, etc., may affect the weighting, where implemented.

Still further, filtering may be implemented as a rolling average of the duration of the correct (desired) behavior in between incorrect events such as an impact, speed violation or moving dismount for example.

In practice, any of the above-metrics and/or scoring techniques can be combined in any practical way to yield a desired system.

Duration and Score-Based Vehicle Modification

In an illustrative implementation, the performance of the industrial vehicle is automatically modified in response to establishing a time-history of proper vehicle operation (predetermined minimum score as compared against a benchmark).

This modification may be in the form of adding a new metric to the metric(s) being evaluated. Adding metrics (and demonstrating proficiency at multiple metrics) will lead to an overall higher operator score, thus adding a metric is considered a positive event in the context herein.

For instance, in a training environment, a new employee may be accountable by the analyzer for a single task, e.g., stopping at the end of aisle. As such, this simple implementation has a single metric, corresponding to an end of aisle stop. Once the requisite proficiency in proper vehicle operation is established (in both duration and score compared to the associated benchmark), a new feature may be unlocked in the form of an additional metric, e.g., ability to enter a restricted zone, introduction to a horn zone, introduction to a speed restriction zone, etc. Here, the industrial vehicle is dynamically modified to receive new information associated with the additional metric, e.g., geo-feature information, new metric information, etc. As such, the trainee operator can be introduced to new warehouse operation policies and rules over time, allowing time for the operator to demonstrate a pattern of proper behavior and proficiency towards already learned tasks.

In an alternative implementation, the new feature may be an improvement, augmentation, revision, upgrade, downgrade, or otherwise change in the capability of operation of the industrial vehicle. For instance, the control electronics of the industrial vehicle may limit the speed, lift height, lift speed, etc., of the industrial vehicle for a new operator. However, a new feature added in response to demonstrating a pattern (suitable duration) of proper activity may be to lift a restriction of the vehicle allowing more of the full performance of the industrial vehicle to be accessible to the operator.

Again, the examples herein can be used with any combination of features previously disclosed.

Rolling Average

The rolling average is an effective way to evaluate data collected from the industrial vehicles in a manner that effectively filters outliers in the data so that a more representative evaluation of industrial vehicle fleet performance can be assessed. The rolling average approach looks to evaluate vehicle performance, and hence, operator behavior, over time. Each metric can have its own rolling average algorithm. For instance, assume that an implementation has a plurality of metrics, including a skill level and an impact metric. Here it may be desirable to weight the impacts metric differently compared to the skill level metric. Since an impact can have more severe consequences, it may be desirable to limit the number of impacts that can be smoothed by the algorithm. Also, since impacts presumably occur with less frequency compared to factors that affect skill level, it may further be desirable to limit the number of impacts that can be smoothed by the algorithm.

Moreover, each rolling average can "tune itself" over time. For instance, by allowing the data to collect over extended periods of time, analysis can be performed by considering several different rolling average algorithms to find one that best matches desired outcomes. For instance, take as an example a metric such as Vehicle Moving Dismounts (a measure of the instances where the vehicle operator steps off of the industrial vehicle while the industrial vehicle is still moving). This data is collected across a number of shifts. The algorithm then evaluates a number of different fixed subset sizes to determine the most effective filtering for a particular application. In this regard, the algorithm can change over time to reflect changes in the environment.

Regardless, the rolling average filter obtains the first element (raw computed score value) of the moving average by taking the average of an initial fixed subset of the number series (of raw computed score values), starting at the first collected raw score value for the metric.

Then the subset is modified by "shifting forward" in the data, thus excluding the first raw score value of the series and including the next raw score value following the original subset in the series. This creates a new subset of modified scores, which is averaged. This process is repeated over the entire data series. The plot line connecting all the (fixed) averages is the moving average.

As noted above, the moving average may also use unequal weights for each datum value in the subset to emphasize particular values in the subset. Also, the algorithm can be tweaked by adjusting the width of the window (i.e., the number of data points in the moving subset), by adjusting weighting values, etc. Again, the examples herein can be used with any combination of features previously disclosed.

Proficiency Ranking

According to further aspects of the present disclosure an algorithm (which can be unique for each measure) translates the duration of the correct (desired) behavior into a rating of performance or a score; for example, Beginner (1), Novice (2), Intermediate (3), Expert (4) and Master (5). The longer the correct behavior persists, the higher the rating and/or score.

As a few illustrative examples, modified score values associated with a given metric can be grouped into rankings to allocate or otherwise classify proficiency, e.g., Basic, Beginner, Intermediate, Advanced, Expert, Master, thus defining a ranking system to evaluate and compare vehicle operators in a normalized manner. Here, ranges of the modified score values are allocated to each ranking. Moreover, one of the rankings can be selected as a specific, selected benchmark. For instance, a warehouse operation may desire all operators to reach the status of Expert for stopping at the end of an aisle, etc. The selection of a rank as a benchmark can drive more detailed scoring mechanisms. Other delineations can alternatively be implemented. In this regard, an analyzer system can generate accurate representations of fleet performance, operator performance, and target performance.

By storing the computed modified scores, and the above classification to rank proficiencies, queries can be run to determine, for instance, how long a user has been classified as an Expert in a given metric. Thus, duration and ranking can be used to determine when to unlock an additional vehicle capability. Moreover, each algorithm can be customtailored to define or otherwise determine the skill level/classification associated with each level. For instance, the algorithm can be used to choose the level of performance to transition from Basic to Beginner, Beginner to Intermediate, Intermediate to Advanced, Advanced, to Expert, Expert to Master, etc.

Moreover, once each metric is independently smoothed using a corresponding smoothing filter, an overall score can be computed and optionally smoothed. Again, the examples herein can be used in any combination of features previously disclosed.

Tuning

As noted above, the specific algorithm implementing the filtering can change over time. Thus, the filtering can be tuned to achieve desired performance. For instance, the window/subset can be adjusted in size to account for the number of outliers/improper response actions that can be tolerated to maintain a desired ranking. This may be determined through trial and error, experimentation, etc.

In certain embodiments, the smoothing window may vary for the same metric, but within transitions of rankings. For instance, ranking can be stored in the history of data. As an operator moves up from beginner towards master, the smoothing window can become smaller and smaller, even to the point of no smoothing. As such, in certain implementations, control variables are utilized to control the smoothing algorithm so that programmability and flexibility are provided. Again, the examples herein can be used with any combination of features previously disclosed.

Example Implementation

Figure 4:
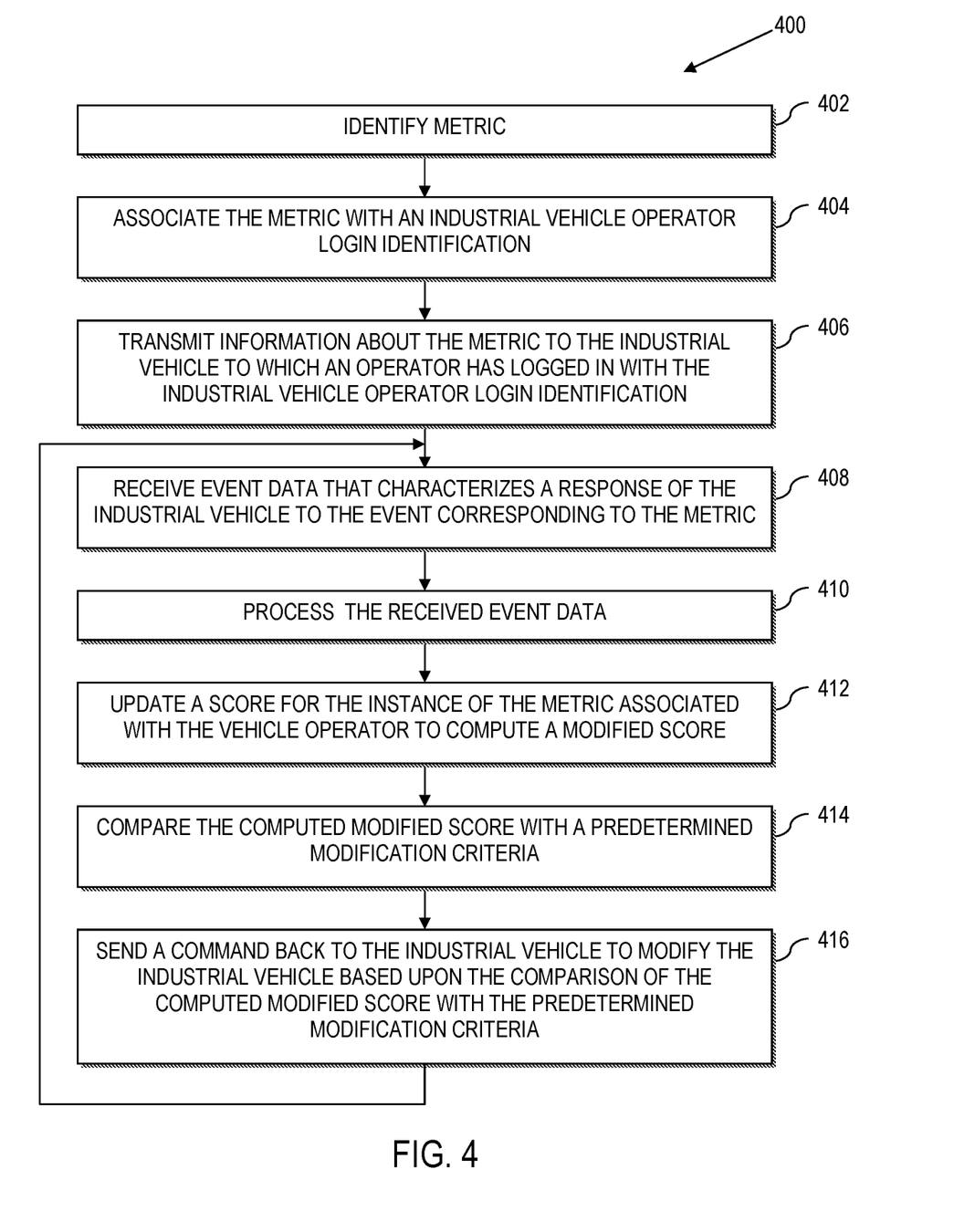
FIG. 4 is a flow chart illustrating a process of computing a score using a smoothing filter, according to aspects of the present disclosure.

Referring to FIG. 4, an example process 400 is illustrated for controlling industrial vehicle performance, e.g., via the scoring set out more fully herein. In this regard, the process 400 may be implemented on computer-readable hardware that stores machine-executable program code, where the program code instructs a processor to implement the described method. The process 400 may also be executed by a processor coupled to memory, where the processor is programmed by program code stored in the memory, to perform the described method. In this regard, the process 400 can be implemented by one or more components in any combination based upon the preceding FIGURES and corresponding description herein.

The process 400 starts by identifying at 402 a metric. For instance, the process identifies, at a server computer, a metric that characterizes an event associated with the operation of an industrial vehicle, where the metric has at least one performance parameter to evaluate against the event. In an example configuration, the performance parameter is defined in such a way as to include at least two states, a proper outcome, e.g., a proper vehicle performance in response to the event, and an improper outcome, e.g., an improper vehicle performance in response to the event.

Although described in the context of a single metric, in practice, there can be any number of metrics as described more fully herein. The procedure herein is expanded to perform the operations for each metric associated with the vehicle operator. As described more fully herein, the metric can be associated with a geo-feature that links an occurrence of the event associated with the metric to a position within an operating environment of the industrial vehicle. However, a geo-feature is not strictly necessary for each event.

The process 400 can optionally associate at 404, the metric with an industrial vehicle operator login identification, e.g., by receiving an operator identification entered by a FOB reader 218 of FIG. 2, entered on a keypad or other entry means. While optional, this may allow data associated with the metric to be sorted and evaluated on a per vehicle operator basis.

The process 400 transmits at 406, information about the metric to the industrial vehicle to which an operator has logged in with the industrial vehicle operator login identification. For instance, as noted in greater detail herein, the industrial vehicles 108 of FIG. 1 and FIG. 2 are equipped with a transceiver for wireless communication. The industrial vehicles 108 are also specially programmed to receive the information and process the information against monitored industrial vehicle operational information, e.g., by monitoring states, encoder positions, switch positions, data values and other data generated by the electronics of the industrial vehicle. As such, the information about the metric triggers specific programming within the industrial vehicle to begin processing the received information against monitored industrial vehicle operational information, examples of which are set out more fully herein.

The process 400 then performs in an ongoing manner a number of operations denoted within the feedback loop. In particular, the process 400 receives at 408 event data. For instance, the process 400 receives, at the server computer, event data that characterizes a response of the industrial vehicle to the event corresponding to the metric.

The process 400 can also optionally process at 410, the received event data. By way of illustration, the received event data can be processed by identifying a vehicle operator associated with the event data and aggregating the event data to an instance of the metric associated with the vehicle operator.

The process 400 updates at 412, a score for the instance of the metric associated with the vehicle operator. In an example implementation, the process 400 updates the score at 412 by evaluating the event data, e.g., comparing the event data to the expected proper outcome, improper outcome, or combination thereof.

In an example configuration, the score is updated by deriving a raw score value based upon the received event data. For instance, the industrial vehicle information may be evaluated to determine whether the industrial vehicle performed a desired action in response to a geo-feature, e.g., did the vehicle stop at the end of an aisle characterized in an end of aisle metric. Here, the expected outcome is that the industrial vehicle stops. The update is further carried out by aggregating the derived raw score value to previously derived raw score values for the metric associated with the vehicle operator. For instance, keeping with the above-example, a raw score value may be a Boolean value, 0 if the vehicle stopped, and 1 if the vehicle did not stop. Other raw scoring approaches are set out in greater detail herein. The update also includes the derived raw score value to previously derived raw score values for the metric associated with the vehicle operator, and computing a modified score by applying a filter to the aggregate of raw score values.

The process 400 further computes a modified score by applying a filter to the aggregate of raw scores. For instance, the process 400 can apply a rolling average filter to the raw data to generate the modified score, which has been smoothed by the filter. In an illustrative example, applying a rolling average comprises applying a rolling average of the duration of raw score values corresponding to a defined proper outcome in between raw score values corresponding to a defined improper outcome.

The process 400 compares at 414, the computed modified score with a predetermined modification criteria. The modification criteria establishes the requirements of the modified score to justify modification to the industrial vehicle. In an example implementation, the predetermined modification criteria is based upon two parameters, duration and modified score, e.g., the modified score should maintain or exceed a predetermined benchmark for predetermined duration (vehicle operator must be an Expert ranking for one month, X proper behaviors, etc.). Thus, the duration can be measured in time (e.g., 1 month) or measured in occurrences (e.g., X number of encounters with the metric, such as 30 encounters with the event associated with the metric). Moreover, the comparison may take into account, a ranking. For instance, a vehicle operator may be ranked on a scale of 1-5, beginner to master, or some other measure. For instance, the ranking can affect the duration, such that it takes a longer duration as the ranking increases.

The process 400 sends at 416, a command back to the industrial vehicle to modify the industrial vehicle based upon the comparison of the computed modified score with the predetermined modification criteria. For instance, the process 400 can compare the computed modified score with a predetermined duration variable, and send the command back to the industrial vehicle where a duration extracted from the event data exceeds the predetermined duration variable, where the duration is measured in time, number of encounters, or other manner. The command may be to unlock or otherwise add new metrics to be evaluated by the industrial vehicle, to remove restrictions on vehicle performance, to implement restrictions on vehicle performance for failing to meet required benchmarks, etc.

Again, the examples herein with regard to FIG. 4 can be used with any combination of features previously disclosed.

Vehicle Interface

According to aspects of the present disclosure, geo-location and truck based measures associated with events are converted into an industrial vehicle performance score. The score, being reflective of vehicle performance, is thus also indicative of an operator score. Scoring calculations that are described herein enable numerous functions that are not otherwise available. For instance, the result of scoring as described herein facilitates intrinsic motivation to sustain long-term behavior change. That is, according to certain aspects of the present disclosure, a scoring system is provided that enables intrinsic rewards. For instance, as described more fully herein, measured vehicle performance that matches desired vehicle operator behavior facilitates intrinsic rewards by motivating the operator to maximize the number of correct event responses over time. Moreover, the smoothing of the data can be tuned to reduce or eliminate outliers, thus increasing intrinsic motivation because occasional or abnormal incorrect event responses may not adversely affect an overall score.

According to further aspects of the present disclosure, a system for dynamic industrial vehicle monitoring and modification is provided. The system is vehicle-centric and interfaces with the vehicle operator. The system comprises an interface that receives logon information of a vehicle operator, e.g., the fob 218 of FIG. 2, a keypad, etc. Notably, the vehicle operator must successfully log into an industrial vehicle before the industrial vehicle is fully operational. As such, the information automatically collected by the industrial vehicle can link the collected information to a vehicle operator, thus associating the behaviors and skill of the operator to the collected vehicle data.

A wireless transceiver, e.g., transceiver 202 of FIG. 2, is provided on the industrial vehicle. As noted herein, the transceiver wirelessly communicates with a remote server. In this regard, the wireless transceiver receives information about a metric that characterizes an event associated with the operation of an industrial vehicle. As noted more fully herein, the metric has at least one performance parameter to evaluate against the event.

The industrial vehicle also includes a processor, e.g., within the control module 204, that is programmed to detect an encounter of the industrial vehicle corresponding to the event associated with the metric, and collect operation information on a current operating state of the industrial vehicle during the event by communicating with native electrical components of the industrial vehicle across a vehicle network bus so as to monitor a response of the industrial vehicle as a result of the encounter with the event. In certain events, this process may be automatically carried out by the industrial vehicle.

As noted more fully herein, in certain implementations, the industrial vehicle also comprises an environmental based location tracking device on the industrial vehicle that detects location information of the industrial vehicle so as to continuously monitor a current location of the industrial vehicle within the limited-range environment. Here, the processor is further programmed to receive geo-feature information about predefined geo-features associated within a predefined, limited-range environment in which the industrial vehicle operates. The event is associated with the geo-feature (which can be location based, vehicle based, task based, etc.). The processor is programmed to detect an encounter of the industrial vehicle corresponding to the event associated with the metric by identifying a geo-feature encounter by determining that a current location of the industrial vehicle coincides with a location of a corresponding geo-feature. Again, the examples herein with regard to the vehicle interface can be used with any combination of features previously disclosed.

Calculating Operator Performance/Gamification

There is also an opportunity for operator involvement to participate in and potentially affect the outcome of the event. For instance, the industrial vehicle includes a user interface, e.g., one of the devices 216 of FIG. 2 implemented as a display and data entry device (e.g., keypad) is used to display a request for a specific behavior of the operator through a prompt message. For instance, using geo-features in combination with environmental based location tracking (e.g., environmental based location tracking 220 of FIG. 2), the system can predict that a vehicle is approaching an end of aisle, and prompt the user to perform the designated correct action/behavior, such as to stop the industrial vehicle. Examples of operator messaging is set out in greater detail in U.S. patent application Ser. No. 14/478,015, and U.S. Provisional Patent Application Ser. No. 62/166,082, already incorporated by reference in their entirety.

The industrial vehicle generates event data from the collected operational information that characterizes a response of the industrial vehicle to the event corresponding to the metric. Keeping with the above example, an end of aisle metric requires that the industrial vehicle come to a complete stop when reaching the end of the aisle. As such, the generated event data will include data that evidences whether the industrial vehicle came to a stop at the correct location (e.g., end of the aisle in this example).

The processor then communicates the generated event data to a remote server computer (e.g., hardware server computer 112 of FIG. 1) via the wireless transceiver 202. Additionally, the system can communicate information to the operator. For instance, the processor, interacting with the display and graphical user interface, provides the operator instant feedback, e.g., confirming the correct behavior or instructing about an incorrect behavior.

Over time, the remote server collects a history that reflects the vehicle and/or vehicle operator encounters with the metrics. For instance, each time the operator navigates the industrial vehicle down the aisle in the current example, there is an opportunity of the vehicle operator to demonstrate a correct behavior (stop at the end of the aisle) or demonstrate an incorrect behavior (do not stop at the end of the aisle). Each outcome is logged and is processed by the server to compute a score associated with the end of aisle metric. That score is processed by a smoothing filter, e.g., rolling average filter, that filters out or otherwise reduces the effect of outliers so that an accidental or inadvertent or unavoidable occurrence, which is clearly out of the normal, does not adversely affect the score and operator rating obtained by the vehicle operator.

In this regard, the industrial vehicle may receive from the remote server computer, a command to modify the performance of the industrial vehicle, where the modification is based upon a score computed based upon previous encounters with the event, where the score is processed by a smoothing filter applied to a history of data collected in response to the metric. The industrial vehicle will not likely receive such a command for each encounter with an event associated with a metric. Rather, the processor may receive from the remote server computer, a command to modify the performance of the industrial vehicle only where the filtered score satisfies a predetermined benchmark for a predetermined duration. For instance, a rolling average of the duration of the correct (desired) behavior in between incorrect events such as an impact, speed violation or moving dismount, can be used to determine when and/or how to automatically adjust the performance of the industrial vehicle.

Moreover, the modification may be in the form of enhancing vehicle performance via performance tuning. Here, the processor is programmed to receive from the remote server computer, a command to modify the performance of the industrial vehicle, by receiving industrial vehicle performance tuning information that is linked to the vehicle operator logged into the industrial vehicle. Thus, the industrial vehicle performance is modified, e.g., faster travel speed, higher lift height, etc. The processor configures at least one performance feature of the industrial vehicle based upon the received industrial vehicle performance tuning. The performance tuning can also eliminate geo-features that create restrictions to the inexperienced operator, e.g., allowing access to loading docks, receiving lanes, etc.

As another example, the command to modify the performance of the vehicle may be to add a new metric to the metric(s) being evaluated by the industrial vehicle. In this manner, the vehicle operator dynamically grow the metrics to which the vehicle operator is judged. The implication of this may be that as the list of metrics grows, and as the vehicle operator establishes proficiency (e.g., higher ranking) of each metric, the vehicle operator is rewarded with an industrial vehicle that has optimized performance capabilities, better performance tuning, etc. Again, the examples above can be used with any combination of features previously disclosed.

Sustaining a Desired Score Via Sustained Intrinsic Motivation

Real-time messages to the operator on the truck display may not sustain the desired behavior in the long term. However, according to aspects of the present disclosure, intrinsic rewards are delivered in a timely and constant fashion, which depend on a calculation of the operator's performance relative to the desired behavior. This enables a scoring system for gamification. A simple rolling average may be determined to be effective and fair.

Miscellaneous

Data smoothing such as rolling averages enables levels of mastery of a response to an event. The levels of mastery can be segmented into rankings, such as Beginner, Novice, Intermediate, Expert, Master. Aspects of the present disclosure also enable behavior-based phased introduction of measures. For instance, as noted in greater detail herein, the system can introduce one new metric at a time to the operator. The operator demonstrates a duration of the correct (desired) behavior on the first measure such that the measured performance is high enough to then be introduced to the next measure. This process is repeated until the operator is exposed to all metrics.

Aspects of the present disclosure also enable behavior-based phased reduction of communication to the operator. The operator demonstrates a duration of the correct (desired) behavior of a measure such that the truck system gradually reduces the user interface communication to the operator. In an example implementation, first the messages become less frequent, then the lights become less frequent, and then the tones diminish. Over time there may be no communication at all. When the operator does not hear or see any communication from the user interface, they become trained to know they are getting credit for sustained correct behavior. If they make a mistake, the user interface will tell them immediately with a red message and lights and tone, or via some other feedback.

Additionally, all measures are normalized into the same levels of mastery/ranking, thus allowing direct comparisons of each measure and custom weightings of each measure. Normalizing each measure to levels of mastery/ranking allows measures to be aggregated together and/or weighted, to form a higher-level measure, e.g., productivity or energy measure, etc. Such a configuration also enables a top-level measure of the operator's total skill. Normalizing each measure to levels of mastery/ranking allows measures to be aggregated up through the customer's levels of management; operator, supervisor, safety manager, warehouse manager, Executive, etc. Again, the examples above can be used with any combination of features previously disclosed.

Computer System Overview

Figure 5:
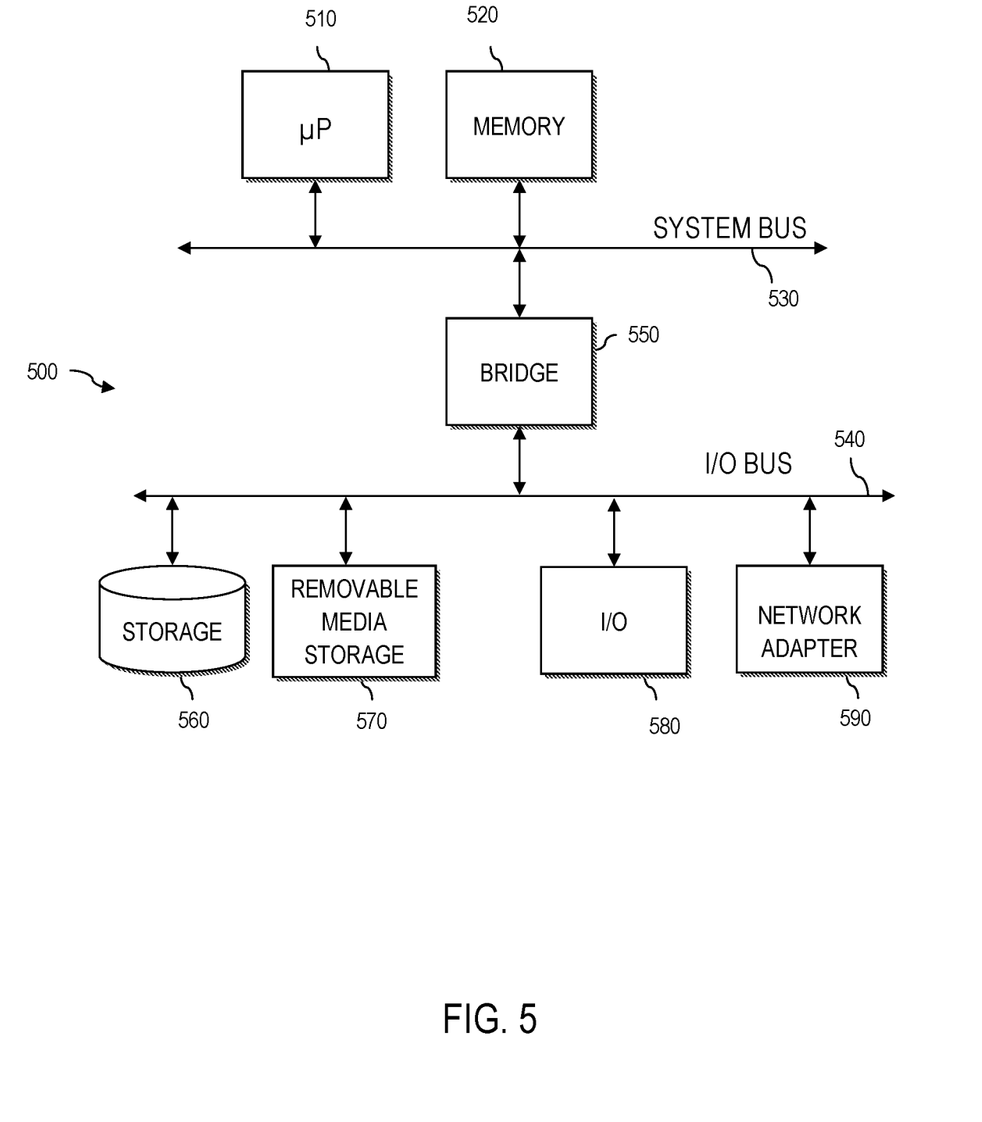
FIG. 5 is a block diagram of a computer processing system capable of implementing any of the systems or methods described more fully herein.

Referring to FIG. 5, a schematic block diagram illustrates an exemplary computer system 500 for implementing the various methods described herein. The exemplary computer system 500 includes one or more (hardware) microprocessors (μP) 510 and corresponding (hardware) memory 520 (e.g., random access memory and/or read only memory) that are connected to a system bus 530. Information can be passed between the system bus 530 and bus 540 by a suitable bridge 550. The bus 540 is used to interface peripherals with the one or more microprocessors (g) 510, such as storage 560 (e.g., hard disk drives); removable media storage devices 570 (e.g., flash drives, DVD-ROM drives, CD-ROM drives, floppy drives, etc.); I/O devices 580 (e.g., mouse, keyboard, monitor, printer, scanner, etc.); and a network adapter 590. The above list of peripherals is presented by way of illustration, and is not intended to be limiting or inclusive. For instance, some implementations, e.g., on an industrial vehicle, may not need all features found on a server computer. Also, other peripheral devices may be suitably integrated into the computer system 500. The memory 520, storage 560, removable media insertable into the removable media storage 570 or combinations thereof, can be used to implement the methods, configurations, interfaces and other aspects set out and described herein.

The microprocessor(s) 510 control operation of the exemplary computer system 500. Moreover, one or more of the microprocessor(s) 510 execute computer readable code that instructs the microprocessor(s) 510 to implement the computer-implemented processes herein. The computer readable code may be stored for instance, in the memory 520, storage 560, removable media storage device 570 or other suitable tangible storage medium accessible by the microprocessor(s) 510. The memory 520 can also function as a working memory, e.g., to store data, an operating system, etc.

A process herein may be implemented as a machine-executable method executed on a computer system, e.g., one or more of the processing devices 102 of FIG. 1, on a particular computing device such as the information linking device 200 described with reference to FIG. 2, on a system 500 of FIG. 5, or combination thereof. In this regard, the processes herein may be implemented on a computer-readable storage device (e.g., computer-readable storage hardware) that stores machine-executable program code, where the program code instructs a processor to implement the described method/process. The processes herein may also be executed by a processor coupled to memory, where the processor is programmed by program code stored in the memory, to perform the described method.

Thus, the exemplary computer system 500 or components thereof can implement methods and computer-readable storage devices as set out in greater detail herein. Other computer configurations may also implement the methods and computer-readable storage devices as set out in greater detail herein. Computer program code for carrying out operations for aspects of the present invention may be written in any combination of one or more programming languages. The program code may execute entirely on the computer system 500 or partly on the computer system 500. In the latter scenario, the remote computer may be connected to the computer system 500 through any type of network connection, e.g., using the network adapter 590 of the computer system 500.

In implementing computer aspects of the present disclosure, any combination of computer-readable medium may be utilized. The computer-readable medium may be a computer readable signal medium, a computer-readable storage medium, or a combination thereof. Moreover, a computer-readable storage medium may be implemented in practice as one or more distinct mediums.

A computer-readable signal medium is a transitory propagating signal per se. A computer-readable signal medium may include computer readable program code embodied therein, for example, as a propagated data signal in baseband or as part of a carrier wave. However, specifically, a computer-readable signal medium does not encompass a computer-readable storage medium.

A computer-readable storage medium is a tangible device/hardware that can retain and store a program (instructions) for use by or in connection with an instruction execution system, apparatus, or device, e.g., a computer or other processing device set out more fully herein. Notably, a computer-readable storage medium does not encompass a computer-readable signal medium. Thus, a computer readable storage medium, as used herein, is not to be construed as being transitory signals per se, such as radio waves or other freely propagating electromagnetic waves through a transmission media.

Specific examples (a non-exhaustive list) of the computer-readable storage medium include the following: a hard disk, a random access memory (RAM), a read-only memory (ROM), an erasable programmable read-only memory (EPROM), Flash memory, a portable computer storage device, an optical storage device such as a compact disc read-only memory (CD-ROM) or digital video disk (DVD), or any suitable combination of the foregoing. In particular, a computer-readable storage medium includes computer-readable hardware such as a computer-readable storage device, e.g., memory. Here, a computer-readable storage device and computer-readable hardware are physical, tangible implementations that are non-transitory.

By non-transitory, it is meant that, unlike a transitory propagating signal per se, which will naturally cease to be detectable, the contents of the computer-readable storage device or computer-readable hardware that define the claimed subject matter persists until acted upon by an external action. For instance, program code loaded into random access memory (RAM) is deemed non-transitory in that the content will persist until acted upon, e.g., by removing power, by overwriting, deleting, modifying, etc.

Moreover, since hardware comprises physical element(s) or component(s) of a corresponding computer system, hardware does not encompass software, per se.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A computer implemented process of controlling industrial vehicle performance, comprising:

identifying, at a server computer, a metric that characterizes an event associated with the operation of an industrial vehicle, the metric having at least one performance parameter to evaluate against the event, wherein the performance parameter indicates a desired performance that correlates to correct operation of the industrial vehicle and is used to enable a feature on the industrial vehicle;

associating the metric with an industrial vehicle operator login identification;

transmitting information about the metric to the industrial vehicle to which an operator has logged in with the industrial vehicle operator login identification, wherein the information about the metric triggers specific programming within the industrial vehicle to begin processing the received information about the metric against monitored industrial vehicle operational information that is collected by the industrial vehicle during use thereof; and performing in an ongoing manner:

receiving, at the server computer, event data that characterizes a response of the industrial vehicle to an instance of the event corresponding to the metric; and updating a score for the instance of the metric, based on the desired performance parameter, associated with the vehicle operator by:

deriving a raw score value based upon the received event data;

aggregating the derived raw score value to previously derived raw scores for the metric associated with the vehicle operator; and computing a modified score by applying a smoothing filter to the aggregate of raw score values to filter outliers caused by incidental actions of the industrial vehicle from the computed modified score to provide a smoothed score, such that the incidental action of the industrial vehicle does not adversely affect enabling the feature on the industrial vehicle;

comparing the computed modified score with a predetermined modification criterion; and sending a command back to the industrial vehicle that enables the feature of the industrial vehicle based upon the comparison of the computed modified score with the predetermined modification criterion.

2. The computer implemented process of claim 1 wherein applying a smoothing filter comprises applying a rolling average of the duration of raw score values.

3. The computer implemented process of claim 1, wherein comparing the computed modified score with a predetermined modification criterion comprises establishing a ranking based upon the computed score.

4. The computer implemented process of claim 1, wherein sending a command back to the industrial vehicle, further comprises comparing the computed modified score with a predetermined duration variable, and sending the command back to the industrial vehicle where a duration extracted from the event data exceeds the predetermined duration variable.

5. The computer implemented process of claim 1, wherein identifying, at a server computer, a metric that characterizes an event associated with the operation of an industrial vehicle, the metric having at least one performance parameter to evaluate against the event, comprises:
   associating the metric with a geo-feature that links an occurrence of the event associated with the metric to a position within an operating environment of the industrial vehicle.

6. The computer implemented process of claim 5, wherein comparing the event data to an expected outcome in response to the event comprises:
   evaluating industrial vehicle information to determine whether the industrial vehicle performed a desired action in response to the geo-feature.

7. The computer implemented process of claim 1, wherein sending a command back to the industrial vehicle includes sending a command back to add a new metric to be evaluated.

8. The computer implemented process of claim 1, wherein sending a command back to the industrial vehicle includes sending a command back to modify a vehicle performance capability.

9. The computer implemented process of claim 1 further comprising applying a ranking based upon the modified score.

10. The computer implemented process of claim 9 further comprising storing the ranking as a time history, wherein comparing the computed modified score with a predetermined modification criterion comprises maintaining a predetermined ranking for a predetermined duration.

11. A system for dynamic industrial vehicle monitoring and modification, the system comprising:
   an interface that receives logon information of a vehicle operator, where the vehicle operator must successfully log into an industrial vehicle before the industrial vehicle is fully operational;
   a wireless transceiver on the industrial vehicle, wherein the wireless transceiver receives information about a metric that characterizes an event associated with the operation of an industrial vehicle, the metric having at least one performance parameter to evaluate against the event, wherein the performance parameter indicates a desired performance that correlates to correct operation of the industrial vehicle and is used to enable a feature on the industrial vehicle; and
   a processor on the industrial vehicle that is programmed to:
      detect an encounter of the industrial vehicle corresponding to the event associated with the metric;
      collect operation information on a current operating state of the industrial vehicle during the event by communicating with native electrical components of the industrial vehicle across a vehicle network bus so as to monitor a response of the industrial vehicle as a result of the encounter with the event;
      generate event data from the collected operational information that characterizes a response of the industrial vehicle to the event corresponding to the metric;
      communicate the generated event data to a remote server computer via the wireless transceiver; and
      receive from the remote server computer, a command that modifies at least one performance capability or otherwise affects the operation of the industrial vehicle based upon a score computed across previous encounters with the event, where the score is processed based upon:
         a raw score value derived from the generated event data;
         an aggregation of the derived raw score value to previously derived raw scores for the metric associated with the vehicle operator; and
         a modified score computed by applying a smoothing filter to the aggregate of raw score values to filter outliers caused by incidental actions of the industrial vehicle from the computed modified score to provide a smoothed score, such that the incidental action of the industrial vehicle does not adversely affect enabling the feature on the industrial vehicle.

12. The system according to claim 11, wherein the smoothing filter comprises a rolling average of the duration of raw score values.

13. The system according to claim 11, wherein the processor receives from the remote server, a command to modify the performance of the industrial vehicle where the filtered score satisfies a predetermined benchmark for a predetermined duration.

14. The system according to claim 11 further comprising:
   an environmental based location tracking device on the industrial vehicle that detects location information of the industrial vehicle so as to continuously monitor a current location of the industrial vehicle within the limited-range environment;
   wherein:
   the processor is further programmed to:
      receive geo-feature information about predefined geo-features associated within a predefined, limited-range environment in which the industrial vehicle operates, where the event is associated with the geo-feature; and
      detect an encounter of the industrial vehicle corresponding to the event associated with the metric by identifying a geo-feature encounter by determining that a current location of the industrial vehicle coincides with a location of a corresponding geo-feature.

15. The system according to claim 14, wherein the geo-feature is a location based feature.

16. The system according to claim 14, wherein the geo-feature is a vehicle based feature.

17. The system according to claim 14, wherein the geo-feature is a task based feature.

18. The system according to claim 11, wherein:
   the processor is programmed to receive from the remote server computer, a command to modify the performance of the industrial vehicle, by receiving industrial vehicle performance tuning information that is linked to the vehicle operator logged into the industrial vehicle; and
   the processor is configured to configure at least one performance feature of the industrial vehicle based upon the received industrial vehicle performance tuning.

* * * * *

UNITED STATES PATENT AND TRADEMARK OFFICE
CERTIFICATE OF CORRECTION

PATENT NO. : 10,625,751 B2
APPLICATION NO. : 15/185646
DATED : April 21, 2020
INVENTOR(S) : Lewis H. Manci et al.

Page 1 of 1

It is certified that error appears in the above-identified patent and that said Letters Patent is hereby corrected as shown below:

In the Specification

Column 22, Line 17, "microprocessors (g) 510" should read --microprocessors (µP) 510--

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*